US010963828B2

(12) United States Patent
Phillips et al.

(10) Patent No.: US 10,963,828 B2
(45) Date of Patent: Mar. 30, 2021

(54) IDENTIFYING AND MANAGING ENTERPRISE PRODUCT AVAILABILITY

(71) Applicant: Capital One Services, LLC, McLean, VA (US)

(72) Inventors: Jeremy Phillips, Brooklyn, NY (US); Shevata Tula, Edison, NJ (US); Maxime Moise, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/517,181

(22) Filed: Jul. 19, 2019

(65) Prior Publication Data

US 2021/0019676 A1    Jan. 21, 2021

(51) Int. Cl.
*G06Q 10/06*  (2012.01)
*G06N 20/00*  (2019.01)
*H04L 29/06*  (2006.01)

(52) U.S. Cl.
CPC ....... *G06Q 10/06314* (2013.01); *G06N 20/00* (2019.01); *G06Q 10/063114* (2013.01); *H04L 63/083* (2013.01)

(58) Field of Classification Search
None
See application file for complete search history.

(56) References Cited

U.S. PATENT DOCUMENTS 8,335,593 B2 * 12/2012 Johnson ............ H02J 13/00002
                                                     700/285
8,645,495 B2 *  2/2014 Johnson ................ G05B 15/02
                                                     709/218

(Continued)

FOREIGN PATENT DOCUMENTS

CA    3002232 A1 * 10/2018 ............. G06N 20/00
CA    3002232 A1    10/2018
(Continued)

OTHER PUBLICATIONS

Soltani, Mohamad, Michele Samorani, and Bora Kolfal. "Appointment scheduling with multiple providers and stochastic service times." European Journal of Operational Research 277.2 (2019): 667-683. (Year: 2019).*

(Continued)

*Primary Examiner* — Matthew S Gart
*Assistant Examiner* — Derick J Holzmacher
(74) *Attorney, Agent, or Firm* — Kacvinsky Daisak Bluni PLLC

(57) ABSTRACT

Various embodiments described herein are generally directed to techniques for identifying the availability of an enterprise to provide products, for example, banking products and/or services. Embodiments may include using an availability manager informed by resource status data to determine if an enterprise facility is available to provide at least one product. In some embodiments, at least some data used to determine the availability of an enterprise facility may be collected from sensors and/or transducers associated with the enterprise facility. Various embodiments may include using a machine learning model to analyze enterprise resource availability to determine enterprise facility availability to provide products. In some aspects described herein, at least one record may be updated with resource status information, facility availability, available product set information, and/or estimated lead time information. In some embodiments, determined availability information may be communicated to a user, for example, via an application program interface (API).

17 Claims, 10 Drawing Sheets

(56) References Cited

U.S. PATENT DOCUMENTS

| | | | |
|---|---|---|---|
| 9,965,797 B1* | 5/2018 | Poole | G06Q 30/0633 |
| 9,990,636 B1* | 6/2018 | Lewis | G06Q 10/0639 |
| 10,083,411 B2* | 9/2018 | Kinsey, II | G06Q 30/0627 |
| 10,325,224 B1* | 6/2019 | Erenrich | G06N 20/00 |
| 10,346,003 B2* | 7/2019 | Selfridge | G06F 21/31 |
| 10,402,760 B2* | 9/2019 | Kinsey, II | G06Q 30/0631 |
| 10,423,911 B2* | 9/2019 | Achtner | H04L 67/22 |
| 2011/0112875 A1* | 5/2011 | Johnson | G06Q 10/10 705/7.11 |
| 2011/0113120 A1* | 5/2011 | Johnson | G05B 15/02 709/218 |
| 2011/0113360 A1* | 5/2011 | Johnson | H04L 12/282 715/771 |
| 2013/0191898 A1* | 7/2013 | Kraft | G06F 21/31 726/6 |
| 2014/0136259 A1* | 5/2014 | Kinsey, II | G06Q 10/1095 705/7.16 |
| 2014/0136264 A1* | 5/2014 | Kinsey, II | G06Q 30/0627 705/7.19 |
| 2014/0136265 A1* | 5/2014 | Kinsey, II | G06Q 30/0631 705/7.19 |
| 2014/0136266 A1* | 5/2014 | Kinsey, II | G06Q 30/0282 705/7.19 |
| 2014/0136373 A1* | 5/2014 | Kinsey, II | G06Q 10/1095 705/26.63 |
| 2014/0136443 A1* | 5/2014 | Kinsey, II | G06Q 10/1095 705/347 |
| 2015/0148078 A1* | 5/2015 | Phillips | G08B 21/0272 455/456.3 |
| 2015/0206252 A1* | 7/2015 | Rephlo | G06Q 40/12 705/30 |
| 2015/0379429 A1 | 12/2015 | Lee et al. | |
| 2015/0379430 A1 | 12/2015 | Dirac et al. | |
| 2016/0012411 A1* | 1/2016 | Kursun | G06Q 20/3221 705/42 |
| 2016/0019640 A1* | 1/2016 | Barnett | G06Q 40/02 705/35 |
| 2016/0232546 A1* | 8/2016 | Ranft | G06Q 40/025 |
| 2017/0046638 A1* | 2/2017 | Chan | G06Q 10/103 |
| 2017/0178048 A1* | 6/2017 | Ghotbi | G06Q 10/063114 |
| 2017/0235452 A1* | 8/2017 | Selfridge | G06F 3/0484 715/744 |
| 2017/0235453 A1* | 8/2017 | Selfridge | G06F 3/0484 715/741 |
| 2017/0235454 A1* | 8/2017 | Selfridge | G06F 3/0484 715/744 |
| 2017/0250885 A1* | 8/2017 | Donovan | H04L 43/16 |
| 2017/0346710 A1* | 11/2017 | Jones-McFadden | G06Q 10/0639 |
| 2017/0346711 A1* | 11/2017 | Jones-McFadden | G06Q 20/3221 |
| 2017/0364534 A1 | 12/2017 | Zhang et al. | |
| 2018/0041447 A1* | 2/2018 | Dintenfass | G06Q 10/063114 |
| 2018/0060122 A1* | 3/2018 | Tang | G06F 9/4887 |
| 2018/0060954 A1* | 3/2018 | Yin | G06F 16/90335 |
| 2018/0088939 A1* | 3/2018 | Strachan | G06F 8/77 |
| 2018/0150783 A1* | 5/2018 | Xu | G06N 20/00 |
| 2018/0204151 A1* | 7/2018 | Achtner | H04L 67/306 |
| 2018/0204159 A1* | 7/2018 | Achtner | G06Q 10/0631 |
| 2018/0234325 A1* | 8/2018 | Moiyallah, Jr. | G06N 20/00 |
| 2018/0276710 A1* | 9/2018 | Tietzen | G06N 3/08 |
| 2018/0285900 A1* | 10/2018 | Bhattacharyya | G06Q 30/0202 |
| 2018/0308025 A1* | 10/2018 | Bansal | G06N 20/20 |
| 2018/0374020 A1* | 12/2018 | Ahani | H04W 4/025 |
| 2019/0121889 A1 | 4/2019 | Gold et al. | |
| 2019/0147430 A1 | 5/2019 | Chen et al. | |
| 2019/0265971 A1 | 8/2019 | Behzadi et al. | |
| 2019/0325355 A1* | 10/2019 | Gladwin | G06Q 10/063114 |
| 2019/0362083 A1 | 11/2019 | Ortiz et al. | |

FOREIGN PATENT DOCUMENTS

| | | | |
|---|---|---|---|
| WO | 2014078672 A2 | 5/2014 | |
| WO | WO-2014078672 A2 * | 5/2014 | G06Q 30/0282 |

OTHER PUBLICATIONS

Eletter, Shorouq Fathi, Saad Ghaleb Yaseen, and Ghaleb Awad Elrefae. "Neuro-based artificial intelligence model for loan decisions." American Journal of Economics and Business Administration 2.1 (2010): 27. (Year: 2010).*

Erdal, Halil Ibrahim, and Aykut Ekinci. "A comparison of various artificial intelligence methods in the prediction of bank failures." Computational Economics 42.2 (2013): 199-215. (Year: 2013).*

Soltani et al., "Appointment Scheduling with Multiple Providers and Stochastic Service Times", European Journal of Operational Research, 277(2):667-683, Mar. 2019.

Eletter et al., "Neuro-Based Artificial Intelligence Model for Loan Decisions", American Journal of Economics and Business Administration, 2(1):27-34, 2010.

Erdal et al., "A Comparison of Various Artificial Intelligence Methods in the Prediction of Bank Failures", Computational Economics 42(2):199-215, 2013.

* cited by examiner

*100*

300A

300B

400

500A

500B

600

700

IDENTIFYING AND MANAGING ENTERPRISE PRODUCT AVAILABILITY

BACKGROUND

Enterprise resources may include or refer to devices, skills, techniques, employees, vendors, or the like used by an enterprise to provide enterprise-offered products. An enterprise may refer to an entity or set of entities, such as businesses or companies, that engages in economic activity to provide products such as goods or services. For example, a bank or banking company may be an enterprise, and products offered by a bank may include financial advising, wealth management, safe deposit boxes, savings accounts, money market accounts, current accounts, individual retirement accounts, fixed deposit accounts, recurring deposit accounts, certificates of deposit, time deposits, mutual funds, mortgages, personal loans, check books, credit cards, debit cards, service by automated teller machines (ATMs), and ATM cards. In order for an enterprise product to be provided, enterprise resources to provide the product must be available. For example, in order for a bank branch to provide financial advising, an employee trained in financial advising may need to be present at the bank branch.

SUMMARY

Various embodiments described herein may include an apparatus, a device, a method, and so forth including a memory to store instructions, and processing circuitry, coupled with the memory. In some embodiments, the processing circuitry is operable to execute the instructions, that when executed, cause the processor to identify a login of a registered user based on receipt of credentials correlated with the registered user and update a user status linked to the registered user based on identification of the login of the registered user. In various aspects, the processor may determine a facility corresponding to the login of the registered user and update a facility status of the facility based on correspondence of the facility to the login of the registered user. In some embodiments, the processor may identify two or more resources of the facility, the two or more resources comprising one or more skills associated with the registered user and one or more devices associated with the facility, and the processor may update two or more statuses based on identification of the two or more resources of the facility corresponding to the user status linked to the registered user. In some aspects, the processor may collect sensor data from one or more transducers located at the facility and update one or more facility sensor statuses based on the sensor data collected from the one or more transducers located at the facility. In various embodiments, the processor may evaluate the user status, the facility status, the two or more resources statuses, and the one or more facility sensor statuses with a machine learning model to determine a set of available products associated with the facility. In some embodiments, the processor may update an availability record corresponding to the facility based on the set of available products associated with the facility.

Various embodiments described herein may include at least one non-transitory computer-readable medium comprising a set of instructions that, in response to being executed by a processor circuit, cause the processor circuit to update a user status linked to a registered user based on identification of a login of the registered user and determine a facility corresponding to the login of the registered user. In some embodiments, the instructions may cause the processor circuit to update a facility status of the facility based on correspondence of the facility to the login of the registered user. In various embodiments, the instructions may cause the processor circuit to identify two or more resources of the facility, the two or more resources of the facility comprising one or more skills associated with the registered user and one or more devices associated with the facility, and update two or more resource statuses based on identification of the two or more resources of the facility corresponding to the user status linked to the registered user. In some embodiments, the instructions may cause the processor circuit to collect sensor data from one or more transducers located at the facility and update one or more facility sensor statuses based on the sensor data collected from the one or more transducers located at the facility. In various aspects, the instructions may cause the processor circuit to evaluate the user status, the facility status, the two or more resources statuses, and the one or more facility sensor statuses with a machine learning model to determine a set of available products associated with the facility. In some embodiments, the instructions may cause the processor circuit to generate an availability record corresponding to the facility based on the set of available products associated with the facility; and provide access to the availability record corresponding to the facility via an application programming interface.

Various embodiments described herein may include a computer-implemented method, comprising identifying a login of a registered user based on receipt of credentials correlated with the registered user. In some embodiments, the method may include updating a user status linked to the registered user based on identification of the login of the registered user. In some embodiments, the method may include determining a facility corresponding to the login of the registered user. In various embodiments, the method may include updating a facility status of the facility based on correspondence of the facility to the login of the registered user. The method may include identifying two or more resources of the facility, the two or more resources of the facility comprising one or more skills associated with the registered user and one or more devices associated with the facility. In some embodiments, the method may include updating two or more resource statuses based on identification of the two or more resources of the facility corresponding to the user status linked to the registered user. In various embodiments, the method may include collecting sensor data from one or more transducers located at the facility. In various aspects, the method may include updating one or more facility sensor statuses based on the sensor data collected from the one or more transducers located at the facility. The method may include evaluating the user status, the facility status, the two or more resources statuses, and the one or more facility sensor statuses with a machine learning model to determine a set of available products associated with the facility. In various embodiments, the method may include updating an availability record corresponding to the facility based on the set of available products associated with the facility.

With such an arrangement, a system and method are provided for identifying the availability of a facility to provide enterprise-offered products.

DETAILED DESCRIPTION

Figure 1:
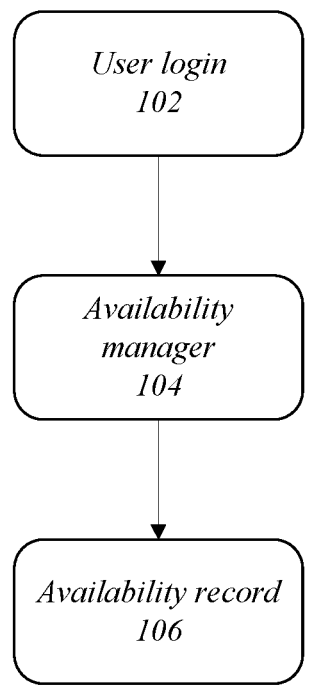
FIG. 1 illustrates exemplary aspects of a system flow according to one or more embodiments described herein.

Various embodiments described herein are generally directed to techniques for identifying the availability of an enterprise to provide products, for example, banking products and/or services. Embodiments may include using an availability manager informed by resource status data to determine if an enterprise facility is available to provide at least one product. In some embodiments, at least some data used to determine the availability of an enterprise facility may be collected from sensors and/or transducers associated with the enterprise facility. Various embodiments may include using a machine learning model to analyze enterprise resource availability to determine enterprise facility availability to provide products. In some aspects described herein, at least one record may be updated with resource status information, facility availability, available product set information, and/or estimated lead time information. In some embodiments, determined availability information may be communicated to a user, for example, via an application program interface (API).

Various enterprises often provide customers with products as part of their services. Such products may comprise physical products, intangible services, or a combination thereof. For example, a bank may provide a customer with a physical products such as a debit card, credit card, ATM card, or check book for access to funds in the customer's account, a cashier's check for access to funds guaranteed by the bank, or cash as part of a withdrawal. Intangible services, for example, could be provided by a bank, including financial advising, service by a mortgage officer, or opening a savings account. Further examples include a bank providing services comprising a combination of physical products and intangible services, for example, activation of a bank card, access to a safe deposit box, or a wire transfer of funds. However, challenges exist in communicating access to enterprise products.

For example, a customer may desire a product from a bank and visit a branch location, kiosk, bank café, or other physical facility associated with the bank. However, not all enterprise facilities may offer all enterprise products. For example, a bank branch may include a vault and be able to provide products such as cashier's checks, but a bank café may not. Customers may not understand the differences between different types of enterprise facilities. As a result, they may go to a facility that does not provide the product they desire. For example, a bank customer desiring a cashier's check may visit a bank café only to learn that the bank café is unable to provide the product. Customers may waste time and still have to visit another facility in order to access their desired product.

In some cases, enterprise locations may offer products temporally, for example, at certain times, when certain conditions are met, or when certain resources are available. For example, a bank may be able to provide a customer with a loan greater than a certain sum of money only when a bank manager is present to approve the loan, but the bank manager may work at different bank facilities at different times of the day, or the bank manager may have gotten sick and left work early for the day. In this example, a customer may arrive at a facility normally able to provide the desired service only to find that an exception is preventing the facility from providing the desired product. In such cases, customers may have to wait at a facility, return at another time, or go to another facility in order to have access to their desired product. Again, as with the examples listed above and others, such instances may result in wasted time. Furthermore, these experiences may frustrate customers and negatively affect their relationship with an enterprise.

In some cases, products may be available at an enterprise which are not expected by customers. For example, a customer may wish to deposit a check at a bank branch in the evening, but listed hours for the facility indicate that the branch has already closed for the day. However, in this example, a bank employee may be working extended hours for the day and be available to help the customer. In this example, among others, a customer may miss out on services being currently offered by a facility due to a lack of proper information concerning current product availability. Additionally, an enterprise may miss out on business from a customer.

Availability of an enterprise to provide a product may then change from facility to facility, and availability within a single facility may change even within the same day. Attempts to manually communicate such changes to customers, for example, through editing information displayed on a website, may be time consuming and taxing for enterprise employees. In some cases, it may be difficult for an employee at a busy enterprise to manage customer requests for products and simultaneously communicate his or her availability to work on further requests in view of changing availabilities of other resources at the facility.

Challenges such as those listed above, among others, may result in missed opportunities, wasted time, and/or frustration on the parts of customers and/or enterprise employees. Miscommunications about product availability at a facility may result in unacceptable delays in providing a customer with a product. Inefficiencies in attempting to communicate availability to customers may cost enterprises time and ability to provide attentive customer service.

Various embodiments described herein can remedy one or more of these challenges and weaknesses. Particularly, embodiments described herein include components that can improve management and communication of information pertaining to enterprise product availability. In embodiments, an availability record for at least one facility may be updated according to recognized activity and resource levels at the at least one facility. In various embodiments, data such as registered user logins, associated user and/or facility statuses, facility resource use, and/or product requirements may be monitored to determine enterprise product availability. In some embodiments, historical data may be analyzed to estimate product availability. In various embodiments, lead times may be estimated for available enterprise products, and in various embodiments, estimation of availability and/or lead time may be informed by a machine learning model. In embodiments, product availability information may be communicated to customers. Components described herein will therefore provide automated, informed determination of enterprise product availability for at least employees and customers of enterprises, thereby improving accuracy, efficiency, and transparency in communicating product availability with respect to enterprise facilities. Accordingly, in various embodiments described herein, management and use of availability information may be implemented in a practical application to increase capabilities of enterprise systems as a whole.

In various embodiments, one or more of the components, techniques, or aspects described herein may be implemented via one or more computing devices, resulting in increased capability and improved functioning of the computer devices. Specific and particular manners of automatically monitoring facility resource availability, analyzing trends in resource availability, and/or dynamically determining availability statuses may be provided by the components described in various embodiments herein. In several embodiments, expected behaviors and behaviors involving the update and management of enterprise facility resources may be performed independently of software utilizing the availability management via familiar, user-friendly interface objects.

In various embodiments, components, techniques, or aspects described herein may be implemented as a set of rules that improve computer-related technology by allowing a function not previously performable by a computer that enables an improved technological result to be achieved. For example, managing an availability record based on user, resource, facility, and facility sensor statuses may be an improved technological result.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates exemplary aspects of a system flow 100 according to one or more embodiments described herein. The system flow may include a user login 102, an availability manager 104, and an availability record 106. Embodiments are not limited in this context.

The user login 102 may be based on input received via a user interface, such as a graphical user interface (GUI) displayed on a desktop computer. In some embodiments, the user login may be based on input receive via other sensors, for example, biometric data collected from the user.

In some embodiments, a user may be an employee of an enterprise, such as a bank. For example, the employee may be a user of a network-connected time recording platform allowing them to clock in and out of work from their computer. In another example, an employee may log into a network-enabled workstation. In some embodiments, the user may log into a system managed directly by the enterprise. In other embodiments, the user may log into a system managed by a third party. In such embodiments, the enterprise may have access to information collected by the third party, for example, via an API. An API may operate via a network-based system, a local operating system, a database system, computer hardware, a software library, or any combination thereof. In some embodiments, an API may operate as a remote API. Embodiments are not limited in this context.

In some embodiments, the user login 102 may involve uniquely identifying information for a user. For example, the user login may comprise a user's company-issued or custom username and password. In other embodiments, the user login 102 may comprise non-identifying credentials. For example, a user login for a general enterprise account could be used to log in to a workstation or an administrative account could be used to log in to specific machines.

In various embodiments, the user login 102 may include information pertaining to the system logged into. For example, such information could include the program logged into or a network address of the system logged into.

The user login 102 may be identified by an availability manager 104. The availability manager 104 may receive the user login 102 in a secure manner, for example, encrypted, secure tunnel, and so forth. In various embodiments, the availability manager 104 may retrieve and/or process information from the user login. For example, the availability manager 104 may identify a specific user associated with the login or the platform or device which was logged into. Further examples include an internet protocol (IP) address from which the user login 102 was initiated and a time stamp for the user login 102.

In various embodiments, the availability manager 104 may have access to information beyond that included in the user login. For example, the availability manager 104 may have access to a memory, database, or other storage for information. Information identifiable by the user login 102 information may be stored, for example, in a database in association with other detailed information. For example, a user login 102 may be used by the availability manager 104 to identify a unique user who is logging in. In this example, the availability manager may be able to search a database for the unique user and identify a specific enterprise facility associated with the user, such as the facility at which the user works.

Information available to an availability manager 104 may include data pertaining to enterprise facilities and/or facility employees. For instance, such data may include services provided at a facility, the presence of equipment and supply quantities needed to provide products, employees present at the facility, employees logged into a system at a facility, such as an electronic time card system, employees currently not engaged in or soon to be engaged in another task, and skills in which present employees have been trained. Such skills may include technical skills, such as using a card printer, or soft skills, such as customer service. In some embodiments, skills may be specific to an enterprise. For example, soft skills for a user associated with a bank may include skills such as permission level, mortgage sales, small business banking, teller, public notary, and training certification.

Further examples of data available to an availability manager 104 include the number of customers at a facility in a waiting queue, regular traffic patterns, and scheduling data such as prescheduled appointments, events scheduled at the facility, including events scheduled for customers and for employees, and appointments requested by walk-in customers. Further examples include utility data relating the facility, such as operating electricity, internet, and water capabilities and rates, and the number of vehicles parked in a parking lot for the facility, as detected by a parking meter, a security camera or sensor, or satellite feed. In some embodiments, such data may be available to the availability manager 104 via at least one transducer associated with the enterprise and/or with a third party. In some embodiments, such data may be available to the availability manager 104 through a third-party system, for example, via an API accessed through a developer exchange program.

One of ordinary skill in the art will recognize that further data useful for assessing the availability of an enterprise facility to provide products at a particular time may be included. Information available to an availability manager 104 may be updated in real or near-real time to maintain accuracy of records. In addition, or alternatively, information available to an availability manager 104 may be pre-stored.

In some embodiments, the availability manager 104 may access detailed information based upon layered logic and/or searches. For example, the availability manager 104 may identify a skill set associated with a user identified with a user login 102, and the availability manager 104 may identify a facility associated with the identified user. In this example, a set of resources may be identified as being associated with the facility, and the availability manager 104 may identify overlap between the user's skill set and facility resources.

The availability manager 104 may, in many embodiments, generate, update, and/or provide an availability record 106 based on the user login 102. In some embodiments, the availability manager 104 may generate, update, and/or provide an availability record 106 based upon the user login 102 and other information available to the availability manager 104. For example, an availability manager 104 may use overlap between a logged-in user's skill set and resources available at a facility associated with the user to identify products as being available at the facility. Such products may be marked in an availability record 106 as being available at the facility.

The availability record may comprise a database, table, or other medium storing data relating to enterprise availability. In some embodiments, an availability record 106 may be associated with a specific enterprise facility. For example, the availability record 106 may comprise a table containing availability information for a facility associated with a user identified by the availability manager 104 from the user login 102. In some embodiments, an availability record 106 may be associated with a plurality of enterprise facilities. For example, a single indexable record could be used to store availability information for all facilities.

An availability manager 104 may generate, update, and/or provide an availability record 106 with availability data for a single facility or for a plurality of facilities based upon the user login 102. For example, a user log-in by a particular user may be used to update in the availability record 106 availability at the facility in which he or she logged in. However, if he or she was previously logged in to another facility, the present log in may be used to indicate in the availability record 106 availability at the present facility and unavailability at the previous facility. Embodiments are not limited in this context.

In some embodiments, the availability manager 104 may not generate, update, and/or provide an availability record 106 based on the user login 102. In such instances, an indicator associated with the user login 102 may be recognized by the availability manager 104 indicating partial or lack of action in provision of an availability record 106. For example, an enterprise employee with a high level of skill, security clearance, or authority may visit a facility to provide a training session to employees of the facility. During this time, he or she may log into an enterprise system. The availability manager 104 may use information available to it, such as a schedule, to recognize the event. In response, the availability manager 104 may not update an availability record 106 to show availability of the enterprise employee's skills for the use of enterprise customers.

In some embodiments, a user logout may be recognized by an availability manager 104. A user logout may be recognized by unavailability of recognition of a user login 102 and/or recognition of a signal indicating logout. A user logout may be used by the availability manager 104 to update an availability manager 104.

Aspects of an availability record 106 may be maintained in real or near-real time. Additionally, or alternatively, aspects of an availability record 106 may be updated periodically. For example, an availability record 106 may be updated in response to a trigger such as a new user login 102, an update of information available to an availability manager 104, in response to an elapsed period of time, or in another request, as described in greater detail herein.

Figure 2:
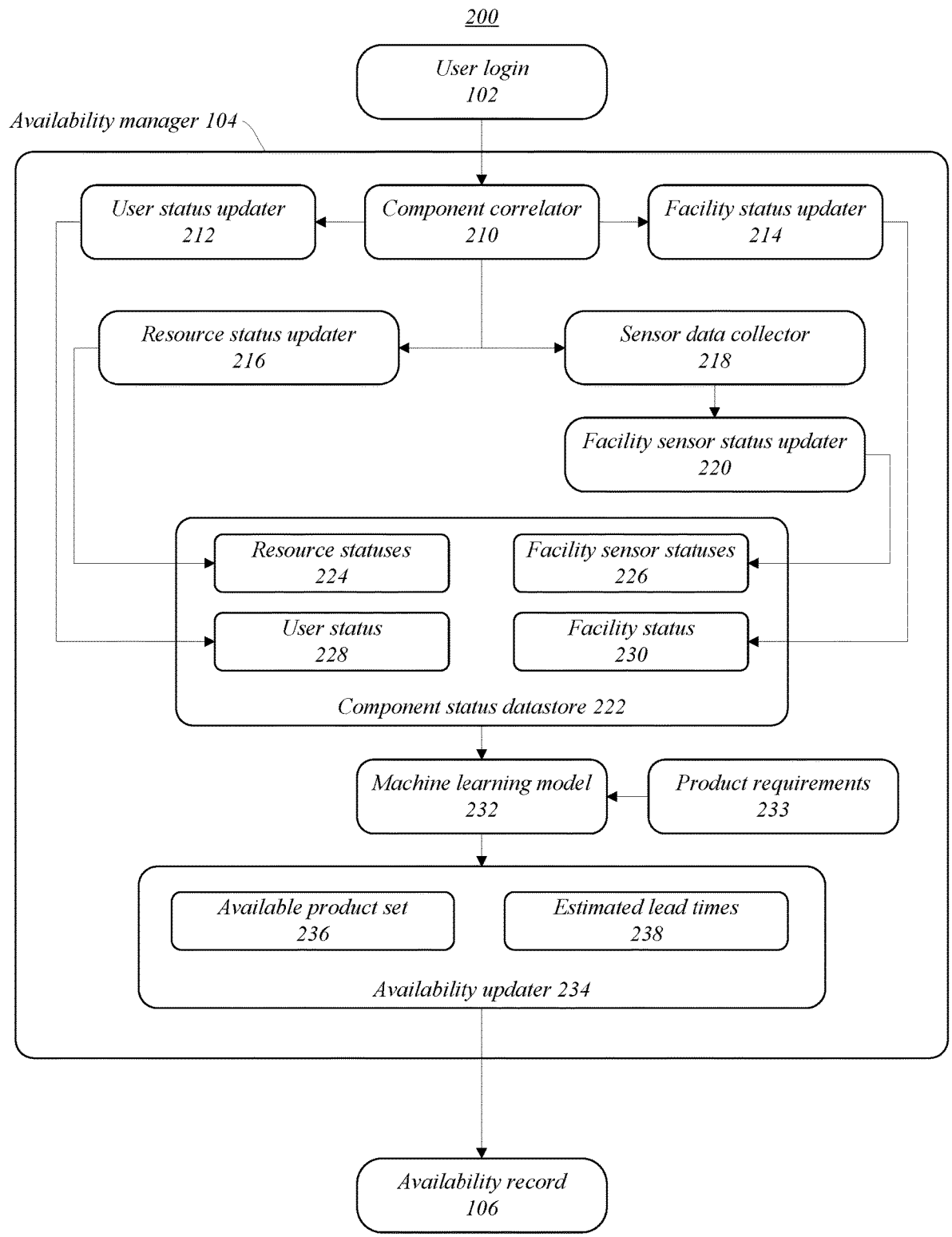
FIG. 2 illustrates exemplary aspects of processing availability information according to one or more embodiments described herein.

FIG. 2 illustrates exemplary aspects of processing a user login according to one or more embodiments described herein. In architecture 200, a user login 102 may be received by an availability manager 104. The availability manager may comprise a processing system that includes one or more computing devices that are interconnected via one or more network links, e.g., wired, wireless, fiber, etc. In some embodiments, the availability manager may be a distributed computing system with each server comprising one or more cores to process information and data. Embodiments are not limited in this context.

The availability manager 104 may include a component correlator 210 which may process the user login 102. The component correlator 210 may identify from the user login 102 information specific to the user login. For example, the component correlator 210 may identify information identifying a user, information identifying a device or platform being logged into, a location or facility associated with the user login, or any combination of data included in the user login 102.

In various embodiments, the component correlator 210 may identify components associated with information identified in the user login 102. For example, a component may include a facility associated with a user identified by the component correlator 210 from the user login 102. Further examples of components identified by the component correlator 210 may include devices and resources present and/or available for use at a facility, sensors and/or transducers associated with a facility, and skills identified as being possessed by the logged in user. Further exemplary components are described below.

The component correlator 210 may identify components correlated with information identified by a user login 102 via access to at least one memory article, table, datastore, or other suitable type of memory unit. Such memory may be local to the component correlator 210, available via a network connection, available via a wired connection, available via another known method, or any combination thereof. In some embodiments, data associated with various components may be available to a component correlator via a plurality of memories. Data may be collected from memories associated with or managed by the enterprise, in some embodiments. In some embodiments, data may be collected from third-party resources. For example, data may be collected by the component correlator 210 via APIs coordinating with other parties, such as via a developer exchange program. Embodiments are not limited in this context.

In some embodiments, the component correlator 210 may identify components correlated with at least a user identified by and/or from the user login 102. For example, a user's availability may be identified. Additionally, further information may be identified in association with the user data. For example, a schedule associated for a user of the user login 102 may be identified. It will be understood that further data useful for ascertaining the availability of a user may be included. In embodiments, a user status updater 212 may be used to update information in a component status datastore 222, for example, in view of information pertaining to user availability as identified by the component correlator 210.

In some embodiments, the component correlator 210 may identify components correlated with the user login 102 that pertain to at least one facility's availability. For example, the facility may be identified from which a user login 102 originated, or a facility may be identified as being associated with a user identified from the user login 102. Information relating to the facility may be further identified. For example, such information may include a regular schedule of the facility, the number of customers at a facility in a waiting queue, regular traffic patterns, prescheduled appointments, events scheduled at the facility, including events scheduled for customers and for employees, and appointments requested by walk-in customers. It will be understood that further data useful for ascertaining the availability of a facility is not outside the scope of the present disclosure and may be included. Information identified by a component correlator 210 relating to a facility may be used by a facility status updater 214 to update information in a component status datastore 222.

In some embodiments, the component correlator 210 may identify components correlated with the user login 102 that pertain to resource availability. Resources may, in various embodiments, be identified as being associated with a user and/or facility identified by the component correlator 210. User-related resources may comprise examples such as at least one skill identified as being associated with a user, a level of security clearance of a user, or an authority level of a user. A resource skill associated with a user may comprise a technical skill, such as using a card printer, or a soft skill, such as customer service. Facility-related resources may comprise examples such as devices present and/or available for use at a facility or supplies present at a facility. For example, devices available at a bank may include an automated teller machine, a money counter, a vault, safety deposit boxes, coffee machine, a certified check printer, a bank card encoder, and a bank card blank. It will be understood that further data useful for ascertaining the availability of at least one enterprise resource may be included. In embodiments, resources identified by a component correlator 210 may be useful for providing a product to a user. Information identified by a component correlator 210 relating to at least one resource may be used by a resource status updater 216 to update information in a component status datastore 222.

In some embodiments, the component correlator 210 may identify components correlated with the user login 102 that pertain to at least one sensor. A sensor may be a transducer associated with the enterprise, the facility, and/or a third party. Sensors may be, in some embodiments, identified as correlating with a facility or resources identified by the component correlator 210. As with previous information described as being available to the component correlator 210, information pertaining to sensors may be available to the component correlator 210 via access to a memory associated with the enterprise, enterprise facility, and/or third party, such as via an API. Information pertaining to sensors may include data recorded by the sensor pertaining to a facility, devices at the facility, or other resources.

Facility-related sensor data may include data such as sensors and/or data collected by sensors pertaining to facility operations and/or traffic. Further examples of data collected and/or available to sensors include utility statuses of the facility, such as operating electricity, internet, and water capabilities and rates, and the number of vehicles parked in a parking lot for the facility, as detected by a parking meter, a security camera or sensor, or satellite feed. One of ordinary skill in the art will recognize that further data collected by sensors and/or useful for assessing the capability of an enterprise facility to handle requests at a particular time may be included. Information identified by a component correlator 210 relating to at least one sensor may be used by a facility sensor status updater 220 to update information in a component status datastore 222.

In some embodiments, sensor-related data identified by the component correlator 210 may be used to identify sensors from which further data is desired. In embodiments such as these, a sensor data collector 218 may be used to retrieve further data from sensors. In some embodiments, a sensor data collector 218 may comprise a database or other memory system of information collected by sensors. In some embodiments, a sensor data collector 218 may comprise a processor and/or set of instructions to gather data from sensors. Data from sensors may be available to the sensor data collector 218 locally and/or via wired, network, or other connection. Data accessible via the sensor data collector 218 may have been previously collected by sensors and/or sensors may be triggered to presently collect data to be available to the availability manager 104 via the sensor data collector 218. In embodiments, data accessible to the availability manager 104 via the sensor data collector 218 may be used by a facility sensor status updater 220 to update and/or enter information into a component status datastore 222.

It will be recognized by one skilled in the art that various examples of information identified by a component correlator 210 as listed above, among others, may pertain to more than one of users, facilities, resources, and sensors. For example, a supply of a resource, such as card blanks for a bank, may be identified as relating to a resource, as listed above, or identified by a sensor, for example, a camera or scanner. Similarly, historic traffic for a facility may be identified as having been identified by a particular sensor, such as a camera or parking meter. Various embodiments may associate data identified by the component correlator 210 with one or more of the categories listed above, and one or more of the status updaters 212, 214, 216, and 220 as described above may be used to update a component status datastore 222 accordingly. In various embodiments, one or more of status updaters 212, 214, 216, and 220 may inform one or more of the other status updaters 212, 214, 216, and 220. For example, a user status being updated to show availability may inform a status update of availability for a facility associated with that user. Any combination and/or ordering of the status updaters 212, 214, 216, and 220 to inform each other in this manner is within the scope of the current discussion.

The status updaters 212, 214, 216, and 220 may, in some embodiments, exist as unique and separate components. In other embodiments, any combination of the status updaters 212, 214, 216, and 220 may exist as a single component. A component may exist in a single location as part of the availability manager 104 or be distributed, for example, across one or more servers. Embodiments are not limited in this context.

In some embodiments, the status updaters 212, 214, 216, and 220 may process the data collected by the component correlator 210 to identify the availability of at least one user, facility, resource, and/or facility sensor as a status. In some embodiments, this status may represent a binary availability level, for example, available or unavailable. In other embodiments, status may include greater detail. For example, levels of operating electricity may be indicated.

The status updaters 212, 214, 216, and 220 may be used to update the component status datastore 222 with at least one status. For example, a user status updater 212 may be used to update a user status 228 in the component status datastore 222, a facility status updater 214 may be used to update a facility status 230 in the component status datastore 222, a resource status updater 216 may be used to update a resource status 224 in the component status datastore 222, and a facility sensor status updater 220 may be used to update a facility sensor status 226 in the component status datastore 222. The status information of the component status datastore 222 as updated by the status updaters 212, 214, 216, and 220 may be useful for determining availability of at least one facility to provide at least one enterprise service.

The component status datastore 222 may, in some embodiments, exist as a table, database, or other memory system accessible to the availability manager 104. In some embodiments, the component status datastore 222 may be local to the availability manager 104. In other embodiments, the component status datastore 22 may be available to the availability manager 104 at least in part via wired, network, or other connection.

In various embodiments, the component status datastore 222 may be used to probabilistically determine an enterprise's ability to provide a service or product. This determination may be made, in some embodiments, with the use of at least one machine learning model 232. In some embodiments, a machine learning model 232 may be informed by the component status datastore 222. A machine learning model 232 may, in various embodiments, be based on historic availability data and/or historic component status data from the component status datastore 222. Historic availability data and historic component status data may be used by the machine learning model 232 to estimate availability of a facility based on component status data.

In some embodiments, a machine learning model may be informed by product requirements 233. In embodiments, product requirements 233 may exist in a storage system coupled to the availability manager 104. The storage system may contain data structures, such as one or more databases, to store information. The availability manager 104 may be coupled to the storage system via one or more wired and/or wireless networking links, and the storage system may be local to the availability manager 104 or in a different location.

Product requirements 233 may comprise associated resources, skills, facility functionalities, and other components necessary for an enterprise to provide a product. A machine learning model 232 informed by product requirements 233 may be better suited to assess not only availability of an enterprise to provide service, but more specific and/or accurate availability of an enterprise to provide specific products to customers. An available product set 236 based on use of at least one machine learning model 232 may be provided to an availability updater 234.

A machine learning model 232 may be used not only to assess current availability of an enterprise, but estimated availability and/or an enterprise's estimated ability to provide a product or service based on that availability. In embodiments, a machine learning model may be used to estimate lead times necessary to provide products or services. Estimated lead times 238 may be provided to an availability updater 234, in various embodiments.

An availability updater 234 may receive availability information understood by components of the availability manager 104, such as by use of a machine learning model 232. The availability updater 234 may, in various embodiments, be able to estimate or have access to an estimated available product set 236 and/or estimated lead times 238 for provision of products. Information may be specific to at least one enterprise facility as specified by the component correlator 210. The availability updater 234 may be used to update an availability record 106. In embodiments, an availability updater 234 may be used to update an availability record 106 in view of an available product set 236 and/or estimated lead times 238.

Figure 3A:
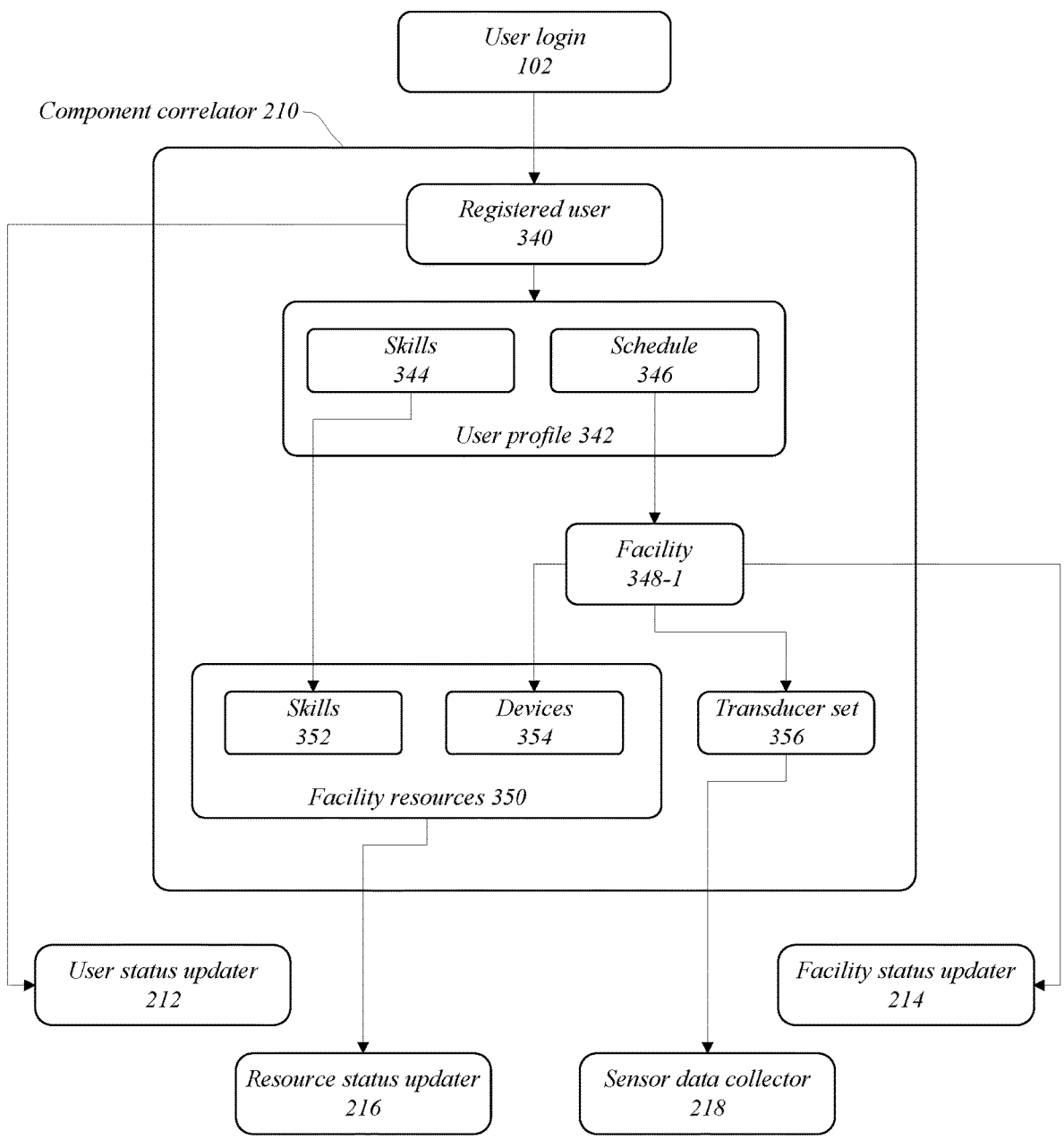
FIG. 3A illustrates exemplary aspects of processing a user login according to one or more embodiments described herein.

FIG. 3A illustrates exemplary aspects of utilizing a component correlator to inform resource status updater components according to one or more embodiments described herein. In architecture 300A, a user login 102 is processed by a component correlator 210. The component correlator 210 may inform at least one status updater based on the user login 102. Embodiments are not limited in this context.

Specifically, a component correlator 210 may identify a registered user 340 from the user login 102. The registered user 340 may be a recognized and/or authorized user of a platform, such as a software and/or device.

In various embodiments, the recognition of a registered user 340 from a user login 102 may inform a user status updater 212. For example, a user status updater may update the status of a registered user to be listed as available in response to that user being recognized as having logged in.

In various embodiments, the component correlator 210 may access and/or refer to a user profile 342 associated with a recognized registered user 340. User profile 342 information may exist in a memory system coupled to the component correlator via a wired or wireless network, and the memory system may be local to the component correlator or exist in a separate location.

A user profile 342 may contain detailed information concerning a registered user 340. In various embodiments, a user profile 342 may include skills 344 or a schedule 346 associated with the registered user 340.

Skills 344 may comprise technical or soft skills in which the registered user is trained in or otherwise qualified to provide. For example, if the registered user is a bank employee, technical skills may include examples such as being able to operate a card printer or operate a coffee machine. Further examples include mortgage sales, small business banking, teller, public notary, training certification, financial advising and customer service. In various embodiments, skills 344 may include security, permission, and/or authorization levels. In some embodiments, soft or technical skills included in skills 344 may be associated with specific security and/or authorization levels.

A schedule 346 may comprise data indicating a registered user's 340 estimated presence at a facility or multiple facilities. In some embodiments, a schedule 346 may include scheduled appointments and/or estimated periods of unavailability. In embodiments, a schedule 346 may be associated in the user profile 342 with a specific enterprise facility or multiple facilities, such as facility 348-1. In some embodiments, a plurality of facilities 1 through n may be identified as being associated with a registered user 340 or schedule 346.

In various embodiments, a schedule 346 may be used to identify a particular facility at which an employee is estimated to be present. In architecture 300A, a facility 348-1 is illustrated for the sake of simplicity. However, it will be understood that if 1 through n facilities are associated with a registered user 340, facility 348-1 . . . n may be identified just as readily as being that at which the registered user 340 is present in accordance with a schedule 346.

In some embodiments, a facility 348-1 may not be associated with a schedule 346, but the facility 348-1 may be identified from the user login 102 nonetheless. For example, the user login 102 may be associated with a device known to exist at a particular facility 348-1. Embodiments are not limited in this context.

In numerous embodiments, a component correlator's 210 identification of a facility 348-1 associated with a user login 102 may inform a facility status updater 214. This may include association via identification with a schedule 346, etc., as described above. For example, a facility 348-1 status may be updated to show availability by a facility status updater 214 in response to identification to a registered user's 340 user login 102 at the facility 348-1. In some embodiments, a facility status updater 214 may update availability statuses for multiple facilities based upon a component correlator 210's identification of a facility 328-1 in association with a user login 102. For example, if a registered user 340 has been recognized as being the only user logged in for a facility 348-n, a user login 102 for the registered user 340 subsequently associated with a facility 348-1 may be used to update the status of facility 348-1 to show availability and to update the status of a facility 348-n to show unavailability.

In various embodiments, a component correlator 210 may have access to and/or keep track of facility resources 350. Facility resources 350 may exist in a memory system coupled to the component correlator via a wired or wireless network, and the memory system may be local to the component correlator or exist in a separate location. Facility resources 350 may indicate resources available for at least one enterprise facility.

Skills 344 identified in association with a particular user profile 342 may be used to inform facility resources 350. For example, skills 344 associated with the user profile 342 of a registered user 340 recognized to be present at a particular facility 348-1 may be available at that facility 348-1 and therefore used to inform a total set of skills 352 available as part of facility resources 350.

Similarly, a facility 348-1 recognized by the component correlator 210 may be used to inform facility resources 350. In some embodiments, a facility 348-1 may be associated with a set of devices, supplies, or other tangible resources which may then be recognized as being available as part of facility resources 350. A set of such resources may be maintained as devices 354 recognized to be available as part of facility resources 350.

In some embodiments, facility resources 350 may be determined to be available based upon a plurality of recognized skills 352 and/or devices 354. For example, a bank card printer may be determined to be an available resource at a facility if and only if a card printer and a user with the technical skill to use it are both present at a facility.

In the same way that facility resources 350 may pertain to one or a plurality of enterprise facilities, skills 352 and/or devices 354 may pertain to one or a plurality of users and/or facilities. In other words, skills 344 may include skills recognized as being available as relating to a single registered user 340 or to a collection of users. Skills 352 and/or devices 354 may pertain to a single facility 348-1 or to a plurality of facilities 348-1 . . . n. Aspects of facility resources 350, including skills 352 and devices 354, may exist in a single memory system or a plurality of memory systems and may be either local to a single location or distributed. Embodiments are not limited in this context.

Facility resources 350 identified by the component correlator 210 may inform a resource status updater 216. A resource status updater 216 may update and/or provide availability information for resources relating to skills 352, devices 354, and/or any combination thereof as related to a registered user 340 and/or facility 348-1 as described above.

In various embodiments, a component correlator 210 may identify a transducer set 356 as being associated with a facility 348-1. Transducers may be enabled to gather data pertaining to an enterprise and/or facility. For example, a transducer may be a camera, satellite, global positioning system, parking meter, water meter, electricity meter, thermostat, scanning system, or other known device which may be used for monitoring use of an enterprise and/or facility. Aspects of transducers may be local and/or remote to an enterprise facility 348-1. Transducers may be managed and/or operated by an enterprise, a facility, by a third-party, or by any partnership therebetween. In some embodiments, at least one transducer of a transducer set may be accessed by the component correlator via an API.

A sensor data collector 218, in some embodiments, may be used according to an identified transducer set 356. A sensor data collector 218 may be used to retrieve further data from transducers. In some embodiments, a sensor data collector 218 may comprise a database or other memory system of information collected by transducers. In some embodiments, a sensor data collector 218 may comprise a processor and/or set of instructions to gather data from transducers. Data from transducers may be available to the sensor data collector 218 locally and/or via wired, network, or other connection. Data accessible via the sensor data collector 218 may have been previously collected by transducers and/or transducers may be triggered to presently collect data via the sensor data collector 218.

Figure 3B:
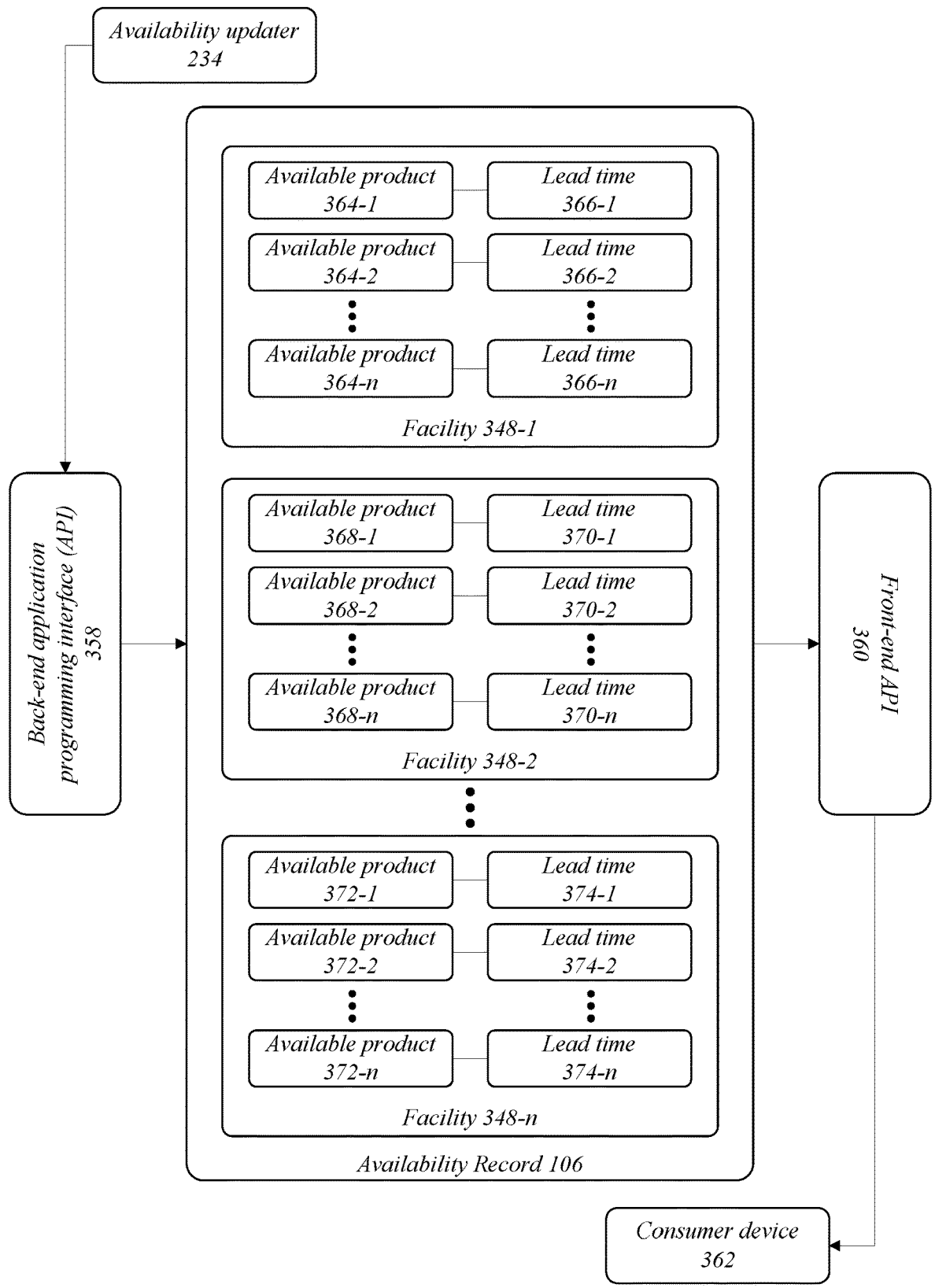
FIG. 3B illustrates exemplary aspects of processing information from a back-end application programming interface according to one or more embodiments described herein.

FIG. 3B illustrates exemplary aspects of providing information pertaining to enterprise availability according to one or more aspects described herein. Embodiments are not limited in this context. In architecture 300B, an availability updater 234 informs a back-end application programming interface (API) 358 to update an availability record 106. Availability information is provided from the availability record 106 to a consumer device 362 via a front-end API 360. Embodiments are not limited in this context.

An availability updater 234 may, in embodiments, be informed by known and/or estimated availability information relating to at least one enterprise, enterprise facility, and/or enterprise product. For example, an availability updater 234 may include aspects of an availability manager 104 as described in association with FIG. 2.

In various embodiments, an availability updater 234 may update an availability record 106 via at least one back-end API 358. A back-end API 358 may operate via a network-based system, a local operating system, a database system, computer hardware, a software library, or any combination thereof. In some embodiments, a back-end API 358 may operate as a remote API.

An availability record 106, may comprise information concerning an enterprise's availability to provide at least one product and/or service. For the discussion herein, a service may be regarded as an enterprise product. Product availability may, in various embodiments, be related to specific enterprise facilities. For each facility, there may be information relating to the availability of various enterprise products. In various embodiments, available products may be associated with lead times estimated for a facility to be able to provide that product. In some embodiments, lead times may be estimated by use of a machine learning model 232. For example, a facility 348-1 may be available to provide an available product 364-1 with an estimated lead time 366-1, an available product 364-2 with an estimated lead time 366-2, an available product 364-n with an estimated lead time 366-n.

In various embodiments, an availability record 106 may comprise records for a single facility 348-1, as exemplarily described in association with FIG. 2. In other embodiments, such as that illustrated in FIG. 3B, an availability record 106 may comprise availability information for a plurality of facilities 348-1, 348-2, . . . and 348-n, where n. Each facility may, in embodiments, have a different set of products associated with it in the availability record 106 such that are available at that facility. For example, facility 348-2 may be available to provide an available product 368-1 with lead time 370-1, an available product 368-2 with lead time 370-2, and available product 368-n with lead time 370-n, while facility 348-n may be available to provide an available product 372-1 with lead time 374-1, an available product 372-2 with lead time 3742-2, and an available product 372-n with lead time 374-n.

In some embodiments, an availability record 106 may be used to communicate information concerning enterprise availability to an enterprise and/or enterprise customers. In some embodiments, a front-end API 360 may be used to provide an availability record and/or information therein to be displayed on a consumer device 362. A front-end API 360 may operate via a network-based system, a local operating system, a database system, computer hardware, a software library, or any combination thereof. In some embodiments, a front-end API 360 may operate as a remote API. Embodiments are not limited in this context.

A consumer device 362 may comprise a device owned and/or managed by an enterprise or an enterprise customer. For example, a consumer device 362 may be a smart phone, laptop, desktop, tablet computer, or server. In some embodiments, a copy of information related to enterprise availability may be sent to the consumer device 362. In other embodiments, information may be relayed for display on the consumer device 362, such as via a website. In various embodiments, availability information may be communicated via a GUI on the consumer device 362. Availability information may be communicated to the user so as to display facilities in association with available products and estimated lead times.

In some embodiments, availability information communicated to the consumer device 362 may be processed and/or filtered based upon facility details. For example, facilities may or may not be communicated and/or displayed on the consumer device 362 according to facility location and/or distance from a consumer device 362, the availability of at least one product, or lead times for product availability.

In various embodiments, a consumer device 362 may receive input from a user, for example, via a GUI. In some embodiments, display of availability information via the consumer device may be adjusted according to the user input. For example, facilities may be displayed in order of estimated lead times for a specific product according to a received filter request from a user. In some embodiments, availability information may be refreshed and/or updated on a consumer device 362 in response to received user input. In various embodiments, an availability record 106 may be updated in response to user input received by a consumer device 362.

Figure 4:
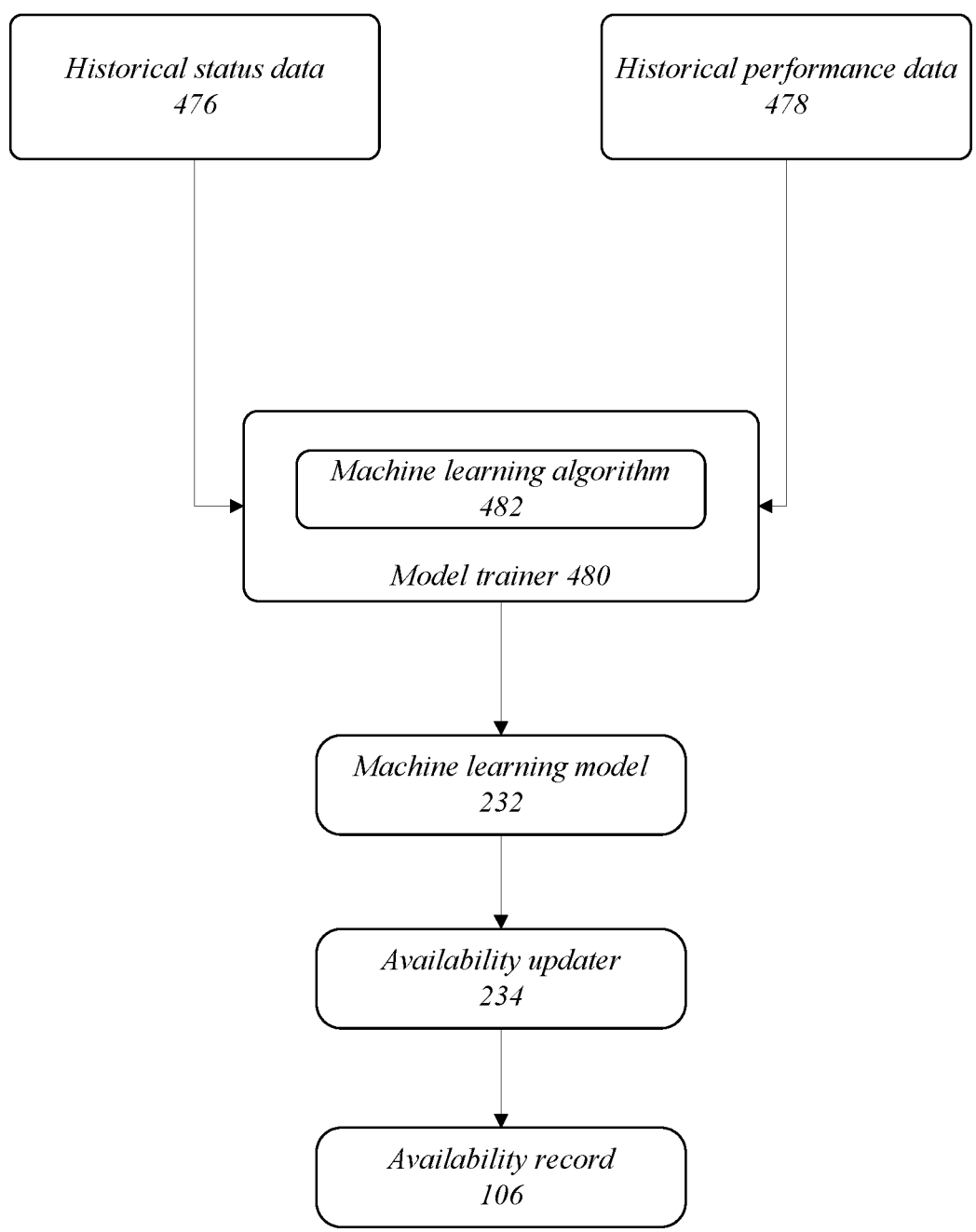
FIG. 4 illustrates exemplary aspects of processing historical data according to one or more embodiments described herein.

FIG. 4 illustrates exemplary aspects of the use of a machine learning model to update an availability record 106 according to one or more embodiments described herein. For example, a machine learning model may comprise a machine learning model 232 as described with regards to FIG. 2. In architecture 400, a model trainer 480 may be informed by historical data such as historical status data 476 and historical performance data 478. The model trainer 480 may be used to produce a machine learning model 232, and an availability updater 234 may use the machine learning model 232 to update an availability record 106. Embodiments are not limited in this context.

A model trainer 480 may be used to generate a machine learning model 232. In various embodiments, the model trainer 480 may be informed by historical status data 476 and/or historical performance data 478. Either or both of historical status data 476 and historical performance data 478 may be stored in at least one database, table, or other memory system coupled to the model trainer 480. Coupling may be via a wired and/or wireless network, and aspects of the memory system may be local to the system, remote, consolidated, and/or distributed.

Historical status data 476 may comprise a record of historical records of statuses. For example, status data may comprise resource statuses 224, facility sensor statuses 226, user status 228, and facility status 230 data. Historical status data 476 may be specific to a single enterprise facility or comprise data relating to multiple enterprise facilities. In embodiments, historical status data 476 may include historical status updates in association with timestamps of the updates.

Historical performance data 478 may comprise a record of historical records of enterprise performance relating to providing products and/or services. For example, historical performance data may comprise historical data relating the time it took for an enterprise to provide a particular product and/or service. In some embodiments, historical performance data 478 may be related to a particular facility and/or user. In some embodiments, historical performance data 478 may be related to multiple facilities and/or users. Historical performance data 478 may, in embodiments, comprise timestamp data in association with performance data. For example, historical performance data 478 may include data describing how long it took for a particular user at an enterprise facility to provide a particular product, or how long it took for a particular enterprise facility to provide a particular set of products on a particular day.

In some embodiments, historical performance data 478 may include a measure of the quality of the product and/or service provided by an enterprise. For example, a product of a bank card misprinted by a bank such that a customer requested a reprint may be associated with a low measure of product quality. In an alternative example, a product provided without flaw by a facility may be associated with a high measure of product quality. In some embodiments, historical performance data 478 may include feedback from enterprise customers concerning enterprise performance regarding the provision of at least one product and/or service. Historical performance data 478 may be specific to a single enterprise facility or comprise data relating to multiple enterprise facilities. It will be understood that further data useful for the tracking of enterprise performance may be included in historical performance data 478.

The model trainer 480 may receive historical status data 476 and/or historical performance data 478 relating to at least one enterprise facility. In embodiments, the model trainer 480 may make use of the data available to it via use of a machine learning algorithm 482. A machine learning algorithm 482 may employ supervised learning, unsupervised learning, reinforcement learning, or any other method commonly known in the art. Aspects of the model trainer 480 may, in embodiments, use historical status data 476 and/or historical performance data 478 to estimate product availability in association with status data.

The model trainer 480 may generate a machine learning model 232. For example, the machine learning model 232 may be a model such as described with respect to FIG. 2. In various embodiments, a machine learning model 232 may comprise estimated enterprise product availability. Aspects of the machine learning model 232 may be based upon current and/or recent status data. In some embodiments, a machine learning model 232 may comprise estimated lead times for products estimated to be available.

An availability updater 234 may use a machine learning model 232 to update an availability record 106. By using a machine learning model 232, the availability updater 234 may be able to update the availability record 106 according to not only instantaneous status data, but according to estimated availability and/or performance for an enterprise to provide at least one product and/or service.

Figure 5A:
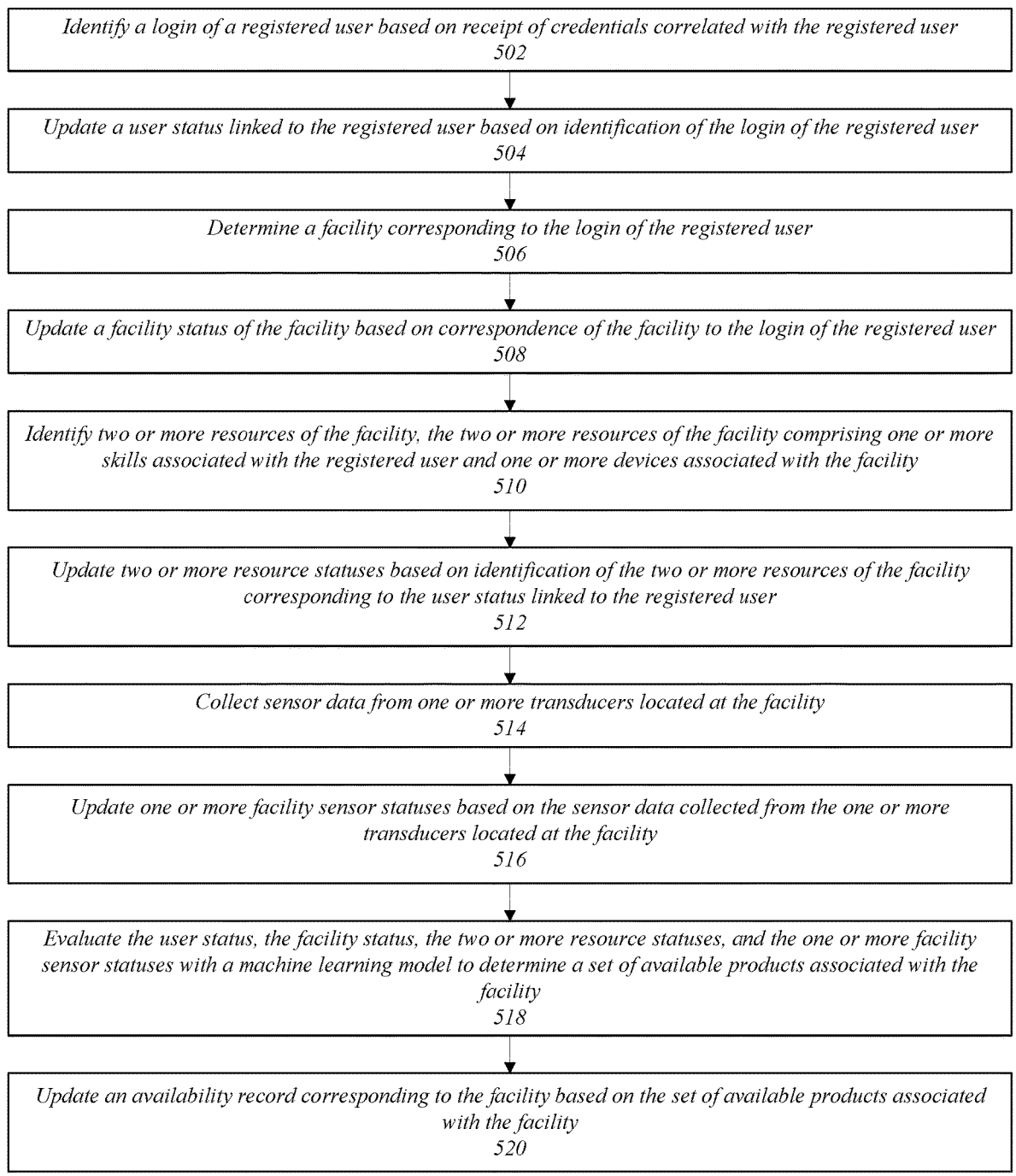
FIG. 5A illustrates a first exemplary logic flow according to one or more embodiments described herein.

FIG. 5A illustrates exemplary aspects of a first logic flow according to one or more embodiments described herein. In logic flow 500A, user login may be used to update an availability record corresponding to a facility. Embodiments are not limited in this context.

In block 502, a login of a registered user is identified based on receipt of credentials correlated with the registered user. For example, a user name and password combination may be used to recognize a user.

In block 504, a user status linked to the registered user is updated based on identification of the registered user of block 502. For example, a registered user's login may be used to update the registered user's status to show availability.

In block 506, a facility is determined to correspond to the login of the registered user. The correspondence may be based on preconfigured information, such as a known place of the user's employment, or the correspondence may be based upon information received in association with the user login, such as a location or IP address.

In block 508, a facility status of a facility is updated based on correspondence of the facility to the login of the registered user. For example, the first login of a day of a registered user associated with a facility may be used to update the facility status to show that the facility is open. In another example, the last logout of a day of a registered user associated with a facility may be used to update the facility status to show that the facility is closed.

In block 510, two or more resources of a facility may be identified. The two or more resources of the facility may comprise one or more skills associated with the registered user and one or more devices associated with the facility. In embodiments, at least one skill associated with the registered user may be related to the use of the one or more devices associated with the facility.

In block 512, two or more resource statuses may be updated based on identification of the two or more resources of the facility corresponding to the user status linked to the registered user. In some embodiments, two or more resource statuses may be updated in conjunction with each other. In some embodiments, two or more resource statuses may be updated independently.

In block 514, sensor data is collected from one or more transducers located at the facility. In some embodiments, sensor data may be pre-recorded. In some embodiments, sensor data may be actively recorded by the transducers.

In block 516, one or more facility sensor statuses may be updated based on the sensor data collected from the one or more transducers located at the facility. For example, availability of devices and/or resources at a facility may be updated according to collected sensor data. Similarly, up-to-date employee busyness and/or traffic levels at an enterprise may be updated according to collected sensor data. Sensor data may, in some embodiments, be collected via the use of at least one API.

In block 518, user status, facility status, the two or more resource statuses, and the one or more facility sensor statuses may be evaluated with a machine learning model to determine a set of available products associated with the facility. In some embodiments, the machine learning model may have been trained using historic data relating to statuses and performance measures associated with the facility.

In block 520, an availability record may be updated, where the availability record corresponds to the facility based on the set of available products associated with the facility. In some embodiments, an availability record may be further updated with estimated lead times of the available products associated with the facility.

Figure 5B:
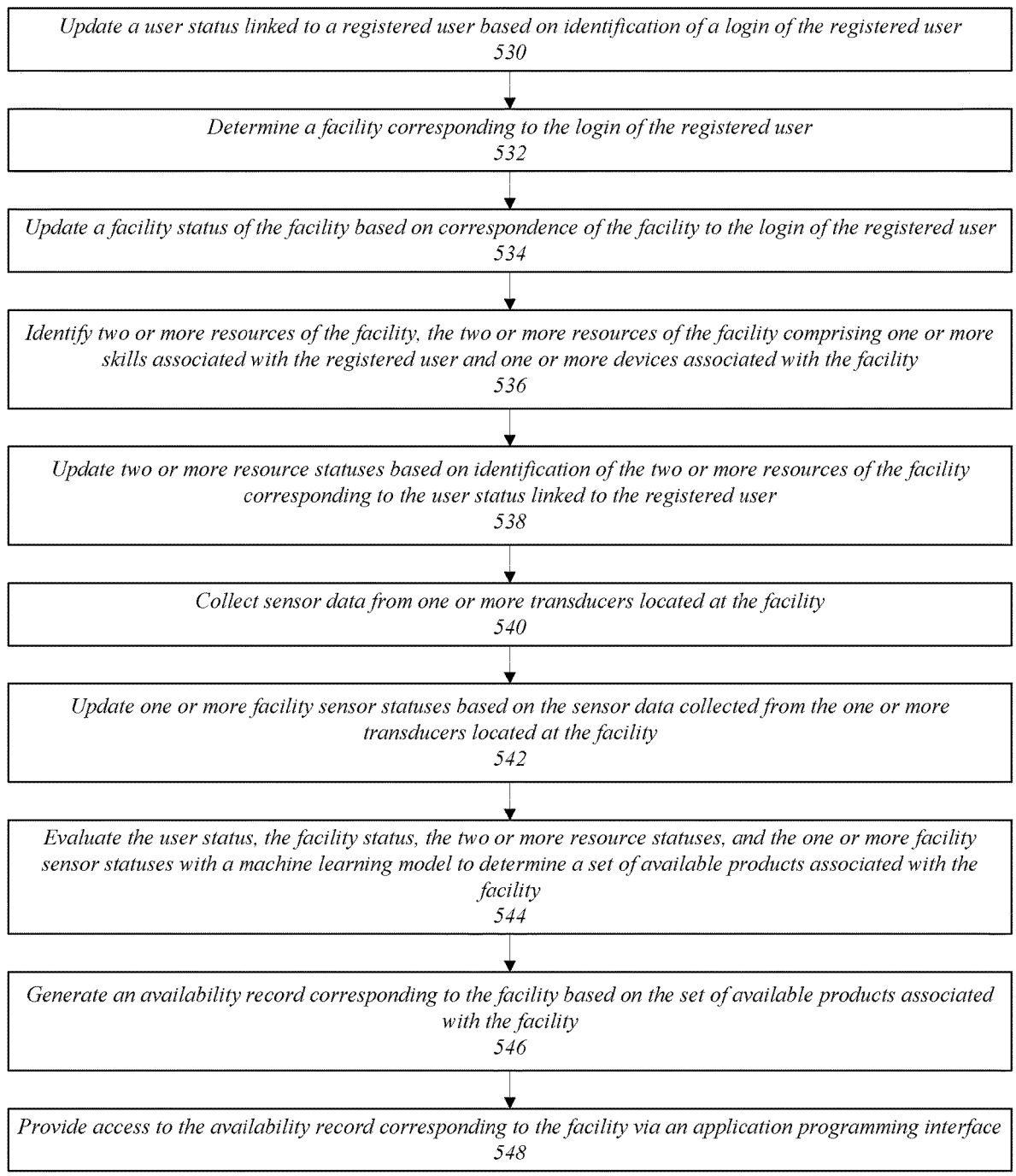
FIG. 5B illustrates a second exemplary logic flow according to one or more embodiments described herein.

FIG. 5B illustrates exemplary aspects of a logic flow according to one or more embodiments described herein. In logic flow 500B, a login of a registered user may be used to generate an availability record, which may be made accessible via an API. Embodiments are not limited in this context.

In block 530, a user status linked to a registered user may be updated based on identification of a login of the registered user. In some embodiments, a status may be a binary indicator of availability or unavailability. In some embodiments, greater detail may be provided, for example, by a selection of or an enumerated encoding of status options. For example, different status options may show a user to be absent, present, busy, or available.

In block 532, a facility may be determined to correspond to the login of the registered user. Correspondence of a facility with a registered user may be preset, or it may be determined actively according to specific details of the login of the registered user and/or the platform for which the registered user logged in.

In block 534, a facility status of the facility may be updated based on correspondence of the facility to the login of the registered user. In some embodiments, a status may be a binary indicator of availability or unavailability. In some embodiments, greater detail may be provided, for example, by a selection of or an enumerated encoding of status options. For example, different status options may show a facility to be open, closed, or having a set of employees available.

In block 536, two or more resources of the facility may be identified. The resources of the facility may comprise one or more skills associated with the registered user and one or more devices associated with a facility. In some embodiments, identified resources may comprise resources already having been identified in association with the facility.

In block 538, two or more resource statuses may be updated based on identification of the two or more resources of the facility corresponding to the user status linked to the registered user. In some embodiments, a resource status may be updated to show binary availability or unavailability of a resource. In some embodiments, a resource status may be updated to show an updated quantity of a resource. For example, a resource status may be updated from showing availability of a single employee at a bank having training in financial counseling to showing availability of two employees having training in financial counseling.

In block 540, sensor data is collected from one or more transducers located at the facility. In some embodiments, transducers may be used to determine availability of human resources and/or at the facility. In some embodiments, transducers may be used to determine availability of supplies, use of utilities, power to enterprise devices, or use of other technical resource.

In block 542, one or more facility sensor statuses may be updated based on the sensor data collected from the one or more transducers located at the facility. In some embodiments, a status may be a binary indicator of availability or unavailability. In some embodiments, greater detail may be provided, for example, by a selection of or an enumerated encoding of status options. In some embodiments, status may be determined according to sensor data being above and/or below a certain threshold.

In block 544, the user status, the facility status, the two or more resource statuses, and the one or more facility sensor statuses may be evaluated with a machine learning model to determine a set of available products associated with the facility. In various embodiments, the machine learning model may be used to estimate lead times for the facility to provide each product in the set of products.

In block 546, an availability record corresponding to the facility is generated. The availability record is generated based on the set of available products associated with the facility. In some embodiments, an availability record may comprise a stored data system or portion thereof.

In block 548, access to the availability record corresponding to the facility may be provided via an application program interface. In some embodiments, an application program interface may be associated with a developer exchange program.

Figure 5C:
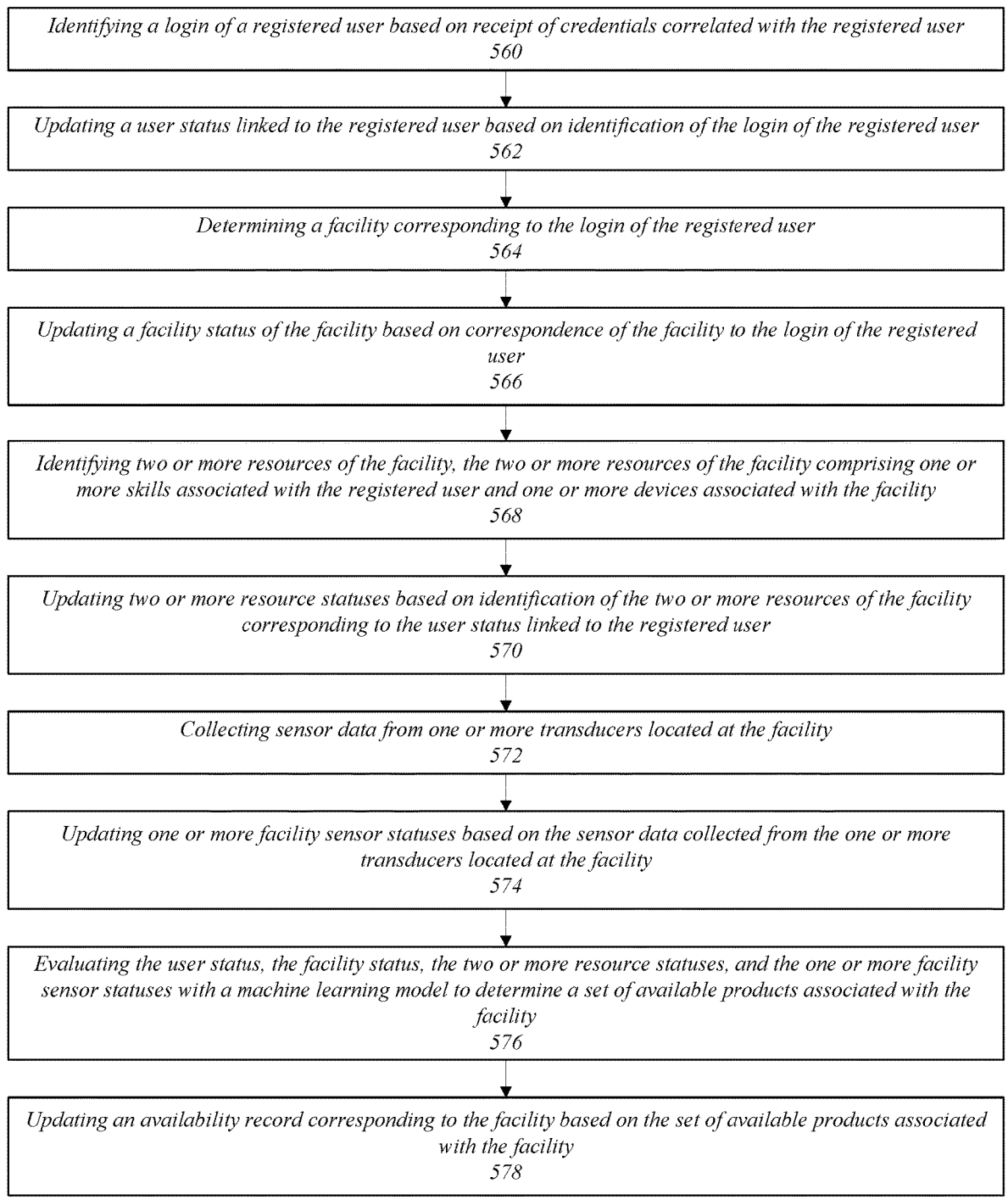
FIG. 5C illustrates a third exemplary logic flow according to one or more embodiments described herein.

FIG. 5C illustrates exemplary aspects of a logic flow according to one or more embodiments described herein. In logic flow 500C, a method describes a way to determine availability of enterprise products at a facility. Embodiments are not limited in this context.

In block 560, the illustrated method includes identifying a login of a registered user based on receipt of credentials correlated with the registered user. For example, a user name and password combination may be used to recognize a user.

In block 562, the illustrated method includes updating a user status linked to the registered user based on identification of the login of the registered user. For example, a registered user's login may be used to update the registered user's status to show availability.

In block 564, the illustrated method includes determining a facility corresponding to the login of the registered user. The correspondence may be based on preconfigured information, such as a known place of the user's employment, or the correspondence may be based upon information received in association with the user login, such as a location or IP address.

In block 566, the illustrated method includes updating a facility status of the facility based on correspondence of the facility to the login of the registered. For example, the first login of a day of a registered user associated with a facility may be used to update the facility status to show that the facility is open. In another example, the last logout of a day of a registered user associated with a facility may be used to update the facility status to show that the facility is closed.

In block 568, the illustrated method includes identifying two or more resources of the facility, the two or more resources of the facility comprising one or more skills associated with the registered user and one or more devices associated with the facility. In embodiments, at least one skill associated with the registered user may be related to the use of the one or more devices associated with the facility.

In block 570, the illustrated method includes updating two or more resource statuses based on identification of the two or more resources of the facility corresponding to the user status linked to the registered user. In some embodiments, two or more resource statuses may be updated in conjunction with each other. In some embodiments, two or more resource statuses may be updated independently.

In block 572, the illustrated method includes collecting sensor data from one or more transducers located at the facility. In some embodiments, sensor data may be pre-recorded. In some embodiments, sensor data may be actively recorded by the transducers.

In block 574, the illustrated method includes updating one or more facility sensor statuses based on the sensor data collected from the one or more transducers located at the facility. For example, availability of devices and/or resources at a facility may be updated according to collected sensor data. Similarly, up-to-date employee busyness and/or traffic levels at an enterprise may be updated according to collected sensor data. Sensor data may, in some embodiments, be collected via the use of at least one API.

In block 576, the illustrated method evaluating the user status, the facility status, the two or more resource statuses, and the one or more facility sensor statuses with a machine learning model to determine a set of available products associated with the facility. In some embodiments, the machine learning model may have been trained using historic data relating to statuses and performance measures associated with the facility.

In block 578, the illustrated method includes updating an availability record corresponding to the facility based on the set of available products associated with the facility. In some embodiments, an availability record may be further updated with estimated lead times of the available products associated with the facility.

Figure 6:
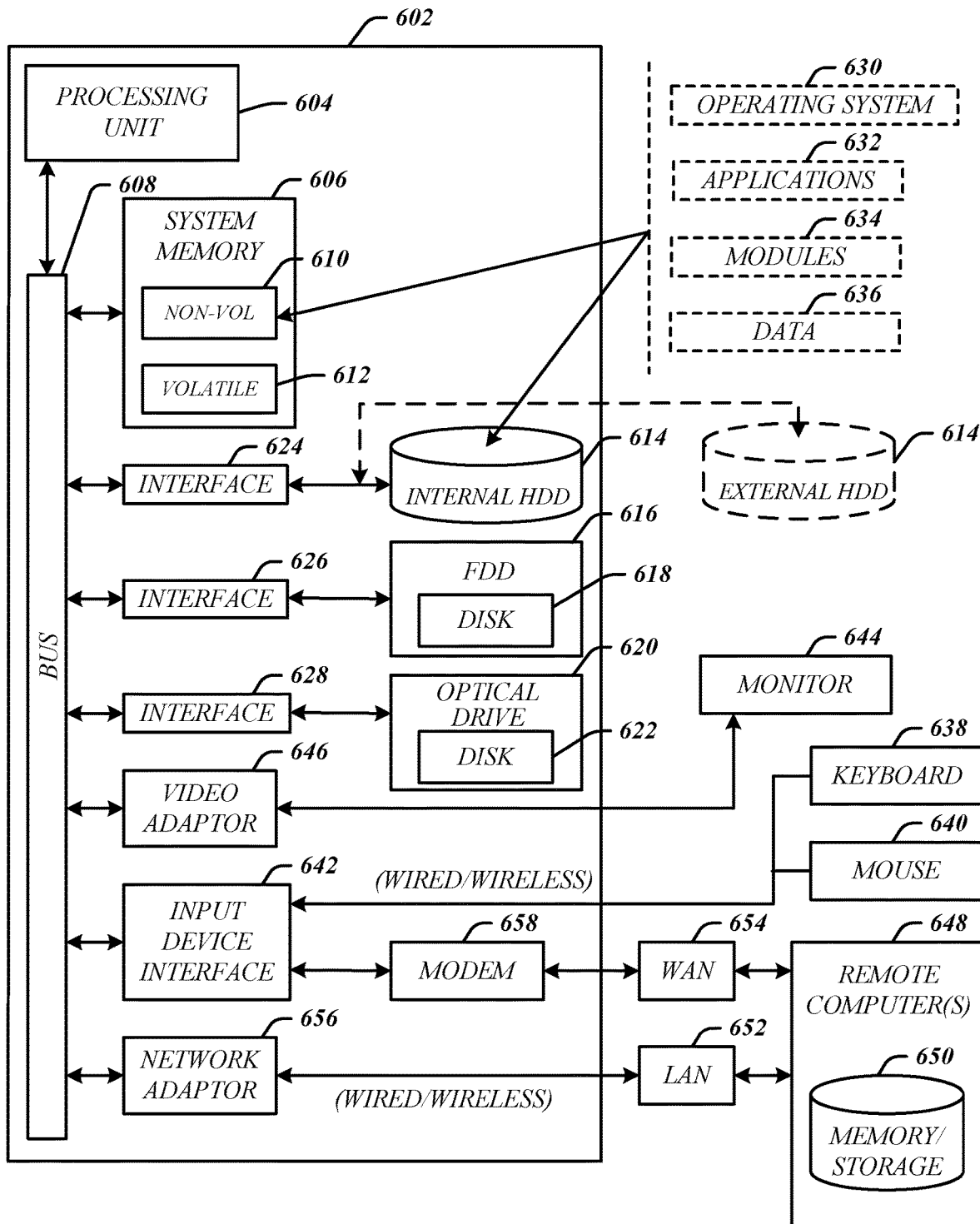
FIG. 6 illustrates an embodiment of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more component described herein. In some embodiments, computing architecture 600 may be representative, for example, of a computing device that implements or utilizes one or more of availability manager 104, component correlator 210, status updaters 212, 214, 214, and 220, and/or one or more techniques described herein. Embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 694 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more interactions described herein migrations may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
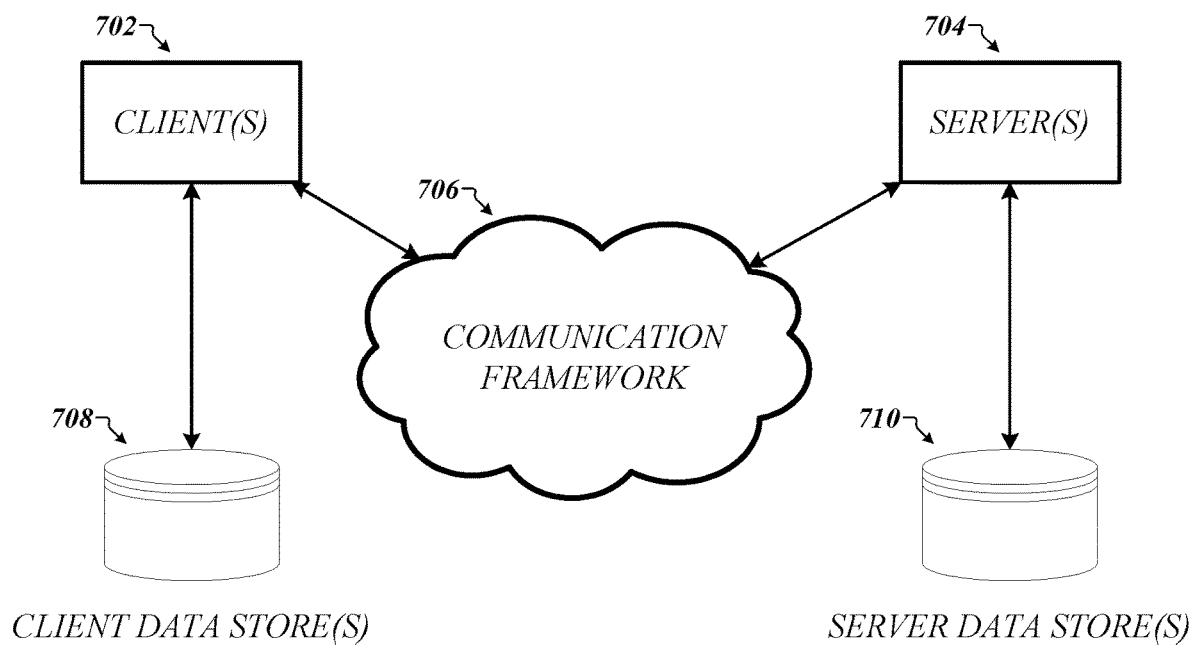
FIG. 7 illustrates an embodiment of a communications architecture according to one or more embodiments described herein.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various users or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The invention claimed is:

1. An apparatus, comprising:
   a processor; and
   a memory comprising instructions that when executed by the processor cause the processor to:
   identify a login of a registered user based on receipt of credentials correlated with the registered user;
   update a user status linked to the registered user based on identification of the login of the registered user;
   determine a facility corresponding to the login of the registered user based on one or more of scheduling data for the registered user and an internet protocol address associated with the login;
   update a facility status of the facility based on correspondence of the facility to the login of the registered user;
   identify two or more resources of the facility, the two or more resources of the facility comprising one or more skills associated with the registered user and one or more devices associated with the facility;
   update two or more resource statuses based on identification of the two or more resources of the facility corresponding to the user status linked to the registered user;
   collect sensor data from one or more transducers located at the facility;
   update one or more facility sensor statuses based on the sensor data collected from the one or more transducers located at the facility;
   evaluate the user status, the facility status, the two or more resources statuses, and the one or more facility sensor statuses with a machine learning model to determine a set of available products associated with the facility; and
   update an availability record corresponding to the facility based on the set of available products associated with the facility.

2. The apparatus of claim 1, the memory comprising instruction that when executed by the processor cause the processor to evaluate the user status, the facility status, the two or more resources statuses, and the one or more facility sensor statuses with the machine learning model to determine a set of estimated lead times comprising an estimated lead time associated with each available product in the set of available products.

3. The apparatus of claim 2, the memory comprising instruction that when executed by the processor cause the processor to update the availability record corresponding to the facility to include the set of estimated lead times.

4. The apparatus of claim 1, wherein the availability record is accessible via an application programming interface.

5. The apparatus of claim 1, the memory comprising instruction that when executed by the processor cause the processor to update a resource status based on a facility sensor status, wherein the resource status and the facility sensor status are associated with a device in the two or more resources of the facility.

6. The apparatus of claim 1, the one or more skills associated with the registered user comprising one or more of a permission level, mortgage sales, small business banking, teller, public notary, and training certification.

7. The apparatus of claim 1, the one or more devices associated with the facility comprising one or more of an automated teller machine, a money counter, a vault, safety deposit boxes, coffee machine, a certified check printer, a bank card encoder, and a bank card blank.

8. The apparatus of claim 1, the memory comprising instruction that when executed by the processor cause the processor to train the machine learning model with historical status data and historical performance data associated with one or more facilities.

9. At least one non-transitory computer-readable medium comprising a set of instructions that, in response to being executed by a processor circuit, cause the processor circuit to:
update a user status linked to a registered user based on identification of a login of the registered user;
determine a facility corresponding to the login of the registered user based on one or more of scheduling data for the registered user and an internet protocol address associated with the login;
update a facility status of the facility based on correspondence of the facility to the login of the registered user;
identify two or more resources of the facility, the two or more resources of the facility comprising one or more skills associated with the registered user and one or more devices associated with the facility;
update two or more resource statuses based on identification of the two or more resources of the facility corresponding to the user status linked to the registered user;
collect sensor data from one or more transducers located at the facility;
update one or more facility sensor statuses based on the sensor data collected from the one or more transducers located at the facility;
evaluate the user status, the facility status, the two or more resources statuses, and the one or more facility sensor statuses with a machine learning model to determine a set of available products associated with the facility;
generate an availability record corresponding to the facility based on the set of available products associated with the facility; and
provide access to the availability record corresponding to the facility via an application programming interface.

10. The at least one non-transitory computer-readable medium of claim 9, comprising instructions that, in response to being executed by the processor circuit, cause the processor circuit to evaluate the user status, the facility status, the two or more resources statuses, and the one or more facility sensor statuses with the machine learning model to determine a set of estimated lead times comprising an estimated lead time associated with each available product in the set of available products.

11. The at least one non-transitory computer-readable medium of claim 10, comprising instructions that, in response to being executed by the processor circuit, cause the processor circuit to update the availability record corresponding to the facility to include the set of estimated lead times.

12. The at least one non-transitory computer-readable medium of claim 9, comprising instructions that, in response to being executed by the processor circuit, cause the processor circuit to update a resource status based on a facility sensor status, wherein the resource status and the facility sensor status are associated with a device in the two or more resources of the facility.

13. A computer-implemented method, comprising:
identifying a login of a registered user based on receipt of credentials correlated with the registered user;
updating a user status linked to the registered user based on identification of the login of the registered user;
determining a facility corresponding to the login of the registered user based on one or more of scheduling data for the registered user and an internet protocol address associated with the login;
updating a facility status of the facility based on correspondence of the facility to the login of the registered user;
identifying two or more resources of the facility, the two or more resources of the facility comprising one or more skills associated with the registered user and one or more devices associated with the facility;
updating two or more resource statuses based on identification of the two or more resources of the facility corresponding to the user status linked to the registered user;
collecting sensor data from one or more transducers located at the facility;
updating one or more facility sensor statuses based on the sensor data collected from the one or more transducers located at the facility;
evaluating the user status, the facility status, the two or more resources statuses, and the one or more facility sensor statuses with a machine learning model to determine a set of available products associated with the facility; and
updating an availability record corresponding to the facility based on the set of available products associated with the facility.

14. The computer-implemented method of claim 13, comprising evaluating the user status, the facility status, the two or more resources statuses, and the one or more facility sensor statuses with the machine learning model to determine a set of estimated lead times comprising an estimated lead time associated with each available product in the set of available products.

15. The computer-implemented method of claim 13, comprising providing access to the availability record via an application programming interface.

16. The computer-implemented method of claim 13, comprising updating a resource status based on a facility sensor status, wherein the resource status and the facility sensor status are associated with a device in the two or more resources of the facility.

17. The computer-implemented method of claim 13, comprising training the machine learning model with historical status data and historical performance data associated with one or more facilities.

* * * * *